United States Patent [19]
Anthony

[11] Patent Number: 4,473,737
[45] Date of Patent: Sep. 25, 1984

[54] REVERSE LASER DRILLING

[75] Inventor: Thomas R. Anthony, Schenectady, N.Y.

[73] Assignee: General Electric Company, Schenectady, N.Y.

[21] Appl. No.: 306,447

[22] Filed: Sep. 28, 1981

[51] Int. Cl.³ .............................................. B23K 27/00
[52] U.S. Cl. ........................ 219/121 LL; 219/121 LM
[58] Field of Search ................. 219/121 LL, 121 LK, 219/121 LG, 121 L, 121 LM, 121 EH, 121 EM, 121 EB

[56] References Cited

U.S. PATENT DOCUMENTS

| | | | |
|---|---|---|---|
| 3,265,855 | 8/1966 | Norton | 219/121 LN |
| 3,410,979 | 11/1968 | Larsson | 219/121 LK X |
| 4,220,842 | 9/1980 | Stürmer et al. | 219/121 LL X |

*Primary Examiner*—C. L. Albritton
*Attorney, Agent, or Firm*—Paul E. Rochford; James C. Davis, Jr.; James Magee, Jr.

[57] ABSTRACT

This invention provides a method for laser drilling small diameter, closely-spaced, and accurately located holes in a body of material which is transparent or substantially transparent to the laser radiation employed whereby the holes are drilled through the thickness of the body from the surface opposite to that on which the laser beam impinges to the surface of laser beam impingement.

13 Claims, 7 Drawing Figures

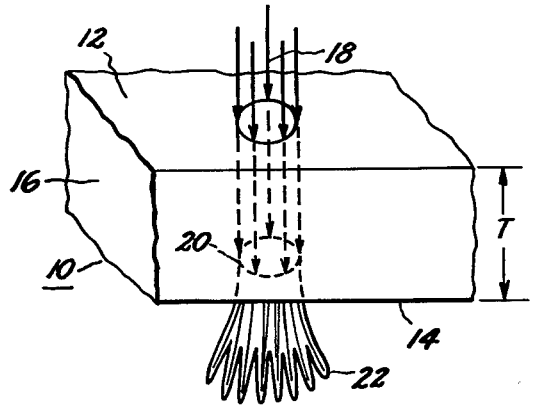
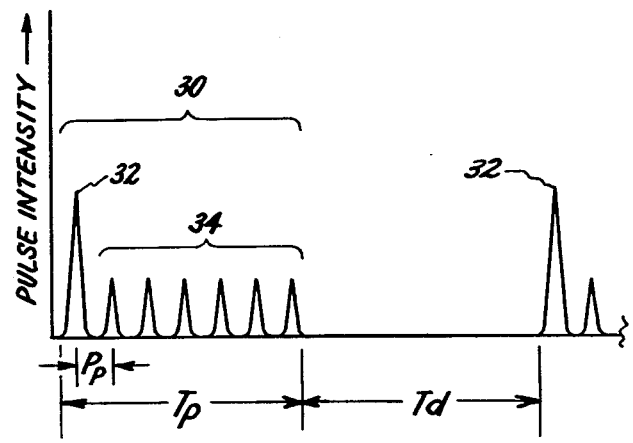
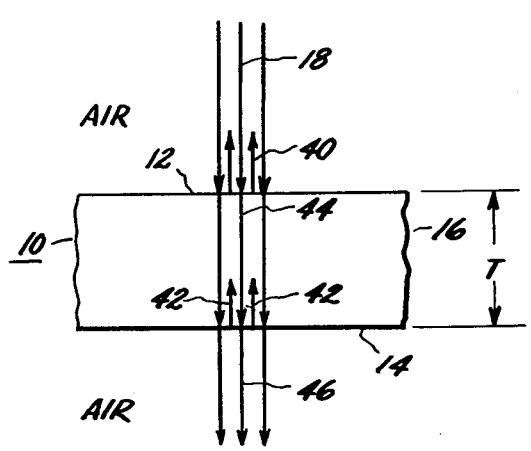
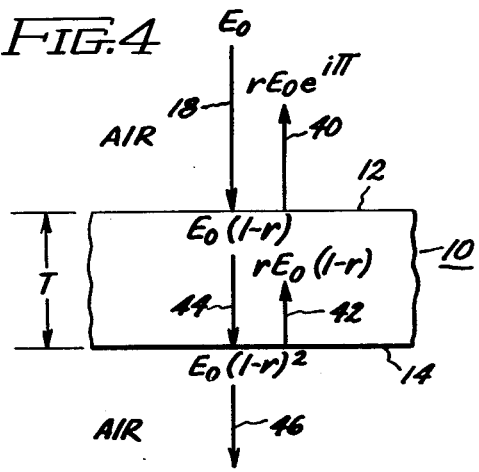
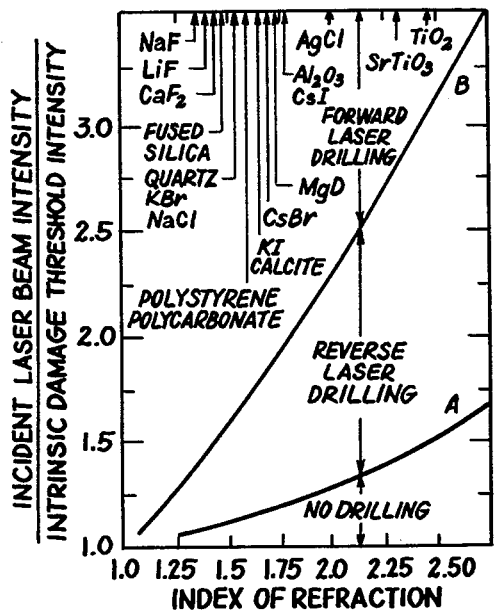
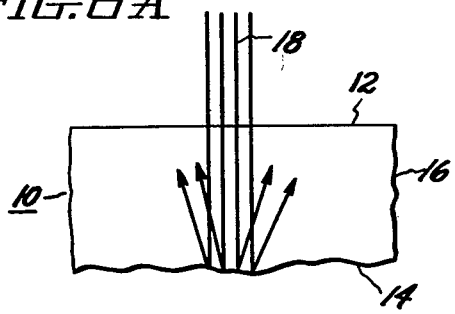
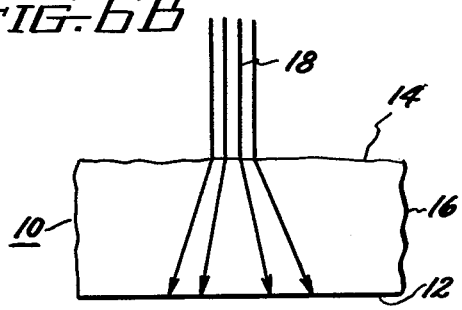

REVERSE LASER DRILLING

The invention described herein was made in the performance of work under NASA Contract No. NAS 5-25654 and is subject to the provisions of Section 305 of the National Aeronautics and Space Act of 1958 (72 Stat. 435; 42 U.S.C. 2457).

The invention herein is related to the invention disclosed and claimed in U.S. patent application Ser. No. 204,957, filed Nov. 7, 1980, in the names of Anthony, Connery and Hoeschele, Jr., for "Method of Forming Conductors Through Silicon-on-Sapphire, and Product". The invention herein is also related to the inventions disclosed and claimed in U.S. patent applications Ser. No. 285,656 for "Implantation of Electrical Feed-Through Conductors", and Ser. No. 285,668 for "Periodic Reverse Current Pulsing to Form Uniformly Sized Feed-Through Conductors"; both of which were filed July 21, 1981 in the name of Anthony. The aforesaid applications are assigned to the same assignee as the instant application and are incorporated herein by reference.

The present invention relates generally to a method for laser drilling small diameter, closely-spaced, and accurately located holes in a body of material which is at least substantially transparent to the laser radiation employed.

Computer science has developed in an era of computer technology in which wire interconnects were inexpensive and logic and switching elements were expensive. Integrated circuit technology has recently reversed the cost situation leaving wire interconnects as the more expensive component. Interconnections between the integrated circuits of a single chip or wafer, whether made of wires or strips of conducting material, are expensive because they occupy most of the space on the wafer and cause most of the delay in electronic signals passing through the system. The same reasoning holds for interconnections between wafers. Computer architecture theory has just begun to take the cost reversal generated by integrated circuit technology into consideration. As a result, computer design has not yet taken full advantage of the range of capabilities implicit in microelectronics.

Current advances in computer design involve the development of a massively parallel information processing system for ultrahigh speed processing of multiple digital data streams. Such multiple data streams are encountered in situations where interactions of the physical data are significant as, for example, in image processing and studies of weather conditions, economics, hydrodynamics and stress. The massively parallel array processor with many processors operating simultaneously and in parallel requires many interconnections between processors. With multiple processors, the number of interconnections, the space occupied by interconnections, the delay time caused by interconnections, the power consumed in interconnections, and the cost of interconnections have increased as the square of the number of processors in the system.

The massively parallel array processor system is built utilizing complementary Metal Oxide Semiconductor/Silicon-on-Sapphire Large Scale Integration (CMOS/SOS LSI) circuitry. Processor arrays on many individual silicon-on-sapphire wafers must also be interconnected. In current technology, all such interconnections must run out to a pad on the edge of a wafer or chip. Such an interconnection scheme has several disadvantages. First, the number of interconnection pads on the periphery of an LSI circuit is very limited. The relatively small number of interconnection pads severely restricts the information flow to and from an LSI circuit. For example, a typical memory chip has 16,384 bits arranged in a 128 by 128 array. An entire row of 128 bits can be accessed at one time, but a selector enables only a single bit to pass to an output pin. A typical memory system is made of 2,048 such chips arranged in 64 groups of 32. Only 32 chips can place their outputs on the 32 wires that join the bus to the central processor. Of the 262,144 bits that move less than a millimeter on each chip, only 2,048 move 3 millimeters to get off their chip and only 32 move a meter to the processor. In other words, because of an effective traffic tie-up on the interconnections, only about eight-thousandths of the available density of the memory chip can be used at present.

The second disadvantage of the interconnection scheme used by current technology is that a large fraction of the area of an LSI circuit is devoted to interconnections. This waste of a large area of a chip or a wafer is a direct consequence of the restriction of interconnections to substantially two-dimensional configurations. Previous methods of providing conventional conductive paths in three-dimensional configurations by placing the paths in layers on one chip have generally resulted in a decrease in the quality of the processed information due primarily to the phenomenon of cross-talk.

Thus there exists a need, especially in the emerging LSI and Very Large Scale Integrated (VLSI) computer technologies, for means by which signals can be transferred rapidly between logic and switching elements on a single semiconductor wafer and/or between wafers in a multi-wafer system while decreasing the amount of wafer surface area occupied by the signal transfer means.

I have now found that a large number of small diameter, closely-spaced, and accurately located holes may be laser drilled in a body of material which is transparent or substantially transparent to the laser radiation employed. In response to the particular needs of the emerging Large Scale Integration (LSI) and Very Large Scale Integration (VLSI) computer technologies, the holes may be provided in the semiconductor substrates of that technology, e.g., silicon-on-sapphire (SOS) wafers, which, when filled with a conducting material, provide through-thickness feed-throughs. Those feed-throughs substantially reduce the number and length of conductive paths needed on the front face of the wafer; increase the speed and quality of information processing; reduce the power consumed by and the heat generated in interconnections; and provide many more access paths to logic, switching and memory elements on the front face of the wafer than conventional means. Further, these through-wafer conducting paths provide a means of substantially reducing the physical space occupied by microelectronic circuits by allowing the wafers to be stacked one on another with the feed-through conductors in each wafer serving as interconnection paths from water to wafer.

Generally and briefly described, the method of this invention involves the steps of providing a body of material and laser beam means which emits a laser beam of a frequency such that the body of material is at least substantially transparent to the beam, the body of material having first and second substantially parallel major surfaces with a peripheral edge area interconnecting the major surfaces and whose thickness is the substantially perpendicular distance between the major surfaces; impinging the laser beam on the first surface of the body; and drilling a hole through the thickness of the body from the second surface to the first surface. The parameters for operation of the laser device supplying the laser beam are selected in accordance with the teachings of the present invention.

Although limited to materials which are transparent or substantially transparent to laser radiation, reverse laser drilling has advantages over forward laser drilling wherein the laser beam is impinged on the first surface and drilling proceeds from the first surface to the second surface and wherein the laser drilling is not limited to materials that are transparent or substantially transparent to the laser radiation.

First, reverse laser drilling minimizes the amount of debris that is deposited on the front surface of the body during laser drilling since all of the debris is ejected out past the rear surface of the body until the last instant. When processing semiconductor wafers, this advantage minimizes possible damage to electronic circuits or devices on the first or impingment surface of the wafer. Second, since laser drilled holes may have a certain degree of taper, with the maximum diameter of the hole on the initiation side of the hole and the minimum diameter of the hole on the exit side of the hole, reverse laser drilling may be oriented so that the area of the drill hole is minimized on the device side of the wafer where real estate is valuable. Finally, reverse laser drilling allows accurate placing of drill holes among microelectronic circuits on the device side of commercial wafers because the laser beam is incident on the face where the electronic circuits are located. These latter two attributes are particularly important when drilling holes in silicon-on-sapphire wafers as drilling from the opposite bottom face of commercial SOS wafers is not practical since drill hole locations cannot be located accurately with respect to microelectronic circuits on the top wafer surface through the foggy ground bottom surface of SOS wafers.

The holes, once drilled, may be filled with conducting material by such techniques as described, for example, in the above-referenced commonly assigned applications Ser. No. 204,957 (i.e., capillary action of epoxy-based or polyimide-based liquids having conducting particles therein) and Ser. Nos. 285,656 and 285,668 (i.e., electroformed copper).

Practice of the present invention will become more fully apparent by having reference to the following detailed description taken in conjunction with the accompanying drawings wherein:

FIG. 1 is a schematic perspective view of a body undergoing reverse laser drilling;

FIG. 2 is a schematic graph of a sequence of laser beam pulse trains used in the practice of reverse laser drilling;

FIG. 3 shows schematically on a cross-section of a body the paths of the incident, reflected and transmitted laser beams which are theoretically present during reverse laser drilling;

FIG. 4 is similar to FIG. 3, but whereon the field strength of the incident, reflected and transmitted laser beams are characterized mathematically;

FIG. 5 is a map showing the conditions, expressed in terms of the ratio of incident laser beam intensity to the intrinsic damage threshold intensity vs. the index of refraction, for which reverse laser drilling may be practiced with a number of representative materials;

FIG. 6A is a schematic representation of the path taken by a laser beam which impinges on the smooth surface of a body having a smooth surface and an opposite rougher surface; and FIG. 6B is a schematic representation of the path taken by a laser beam which impinges on the rough surface of a body having a rough surface and an opposite smoother surface.

In FIG. 1 there is shown in schematic perspective fashion body 10 undergoing reverse laser drilling. Body 10 is frequently referred to in the semiconductor arts as a substrate, wafer, or chip and typically has a first or top major surface 12 which is substantially parallel to second or bottom major surface 14. Peripheral edge area 16 interconnects major surfaces 12 and 14. The thickness, T, of body 10 is the substantially perpendicular distance between surfaces 12 and 14.

In reverse laser drilling, laser beam 18 impinges on first or entrance surface 12. Drilling initiates on the surface opposite to entrance or impingement surface 12, i.e., second or exit surface 14, and hole 20 progresses "upstream" of laser beam 18 toward surface 12 on which laser beam 18 is impinging while a plume of debris 22 is ejected periodically out past bottom surface 14. In conventional, or forward, laser drilling, beam 18 impinges on first surface 12, drilling initiates at first surface 12, and hole 20 progresses toward opposite surface 14 "downstream" of impinging laser beam 18. Although a laser beam does not "drill" in the classical mechanical sense, it is considered to do so for the purposes of this invention.

The laser beam means or device (not shown) emits light of a freqency to which the material of body 10 is at least substantially transparent and is operated in a repetitively Q-switched mode to produce beam 18 having the characteristics shown schematically in FIG. 2. During the drilling sequence, the laser device emits beam 18 in the form of a continuous train of individual pulses 30 having pulse period $P_p$, pulse train duration time $T_p$ and delay time $T_d$ between successive trains. Each pulse train 30 is led by giant pulse 32. This giant pulse is important because it greatly increases the absorption coefficient of the layer where drilling initiates, allowing the following smaller pulses 34 to vaporize and drill the material of body 10. A series of separate pulse trains is used rather than one continuous pulse train in order to obtain more of the desirable giant pulses. This sequence of pulse trains is repeated over and over again until the hole is drilled.

Although it is not intended to limit the present invention to any specific theory of action or mechanism, it is believed that the most probable cause of reverse laser drilling is the destructive and constructive interference between primary beam 18 and reflected laser beams 40 and 42 that occur, respectively, on entrance 12 and exit 14 surfaces of body 10 as shown schematically in FIG. 3.

On entrance surface 12, reflected beam 40 experiences a phase change of $\pi$ on reflection because beam 18 is passing from a lower (air) to a higher index-of-refraction medium. The resulting destructive interference reduces the intensity of reflected beam 40 at entrance surface 12 to a percentage (52% in the case of sapphire) of the intensity of impinging beam 18. Beam 44 transmitted through entrance surface 12 also has the same percentage (52% in the case of sapphire) of the intensity of impinging beam 18 as does reflected beam 40. Consequently, on or near entrance surface 12, laser beam 18 is weakened by the effects of reflection.

In contrast, on exit face 14 of body 10 constructive intereference increases the intensity of transmitted laser beam 44 to nearly that of beam 18 when incident on surface 12 (i.e., from 52% to 85% in the case of sapphire). Constructive interference occures on exit face 14 of body 10 because light reflecting from a surface where a light beam is passing from a higher to a lower index-of-refraction medium suffers no phase change. In other words, when light strikes a boundary from the side of lower velocity, no phase change occurs, whereas when light strikes a boundary from the side of higher velocity, a phase change of $\pi$ occurs. This phenomenon is the same type encountered in the reflection of simple mechanical waves, such as sound waves in solids or a transverse wave in a rope. Reflection with a change in phase, where the velocity decreases in crossing the boundary (entrance surface), corresponds to the reflection of waves from the fixed end of a rope. Here the elastic reaction of the fixed end of a rope immediately produces a reflected train of opposite phase traveling back along the rope. The case where the velocity increases in crossing the boundary (exit surface) has its parallel in reflection from a free end of a rope. The end of the rope undergoes a displacement twice the amount it would if the wave were continuous (constructive interference), and it immediately starts a wave in the reverse direction having the same phase as the incident wave.

It is clear that if the intensity of original laser beam 18 is very high, drilling will initiate on the entrance surface, as was observed in the case of the invention in the cross-referenced Ser. No. 204,957 application. If, however, the intensity of original laser beam 18 is too low, constructive interference on exit face 14 of body 10 will not boost the beam intensity enough to initiate drilling there. Hence, low-intensity laser beams will not laser drill.

As I have discovered, only a small window exits in the available range of laser-beam intensities that is compatible with reverse laser drilling. A first-order calculation of this intensity range can be made as follows. With reference to FIG. 4, laser beam 18 with an electric field strength $E_o$ is shown impinging on body 10. Reflected beam 40 with a strength $rE_o$ is reflected from entrance surface 12 of body 10 with a phase change of $\pi$. Here, r is the amplitude coefficient of reflection for the interface between air and the material of body 10. Transmitted beam 44 of strength $E_o(1-r)$ leaves entrance surface 12, passes through body 10, and strikes exit surface 14. Beam 42 of strength $rE_o(1-r)$ is reflected from exit surface 14 with no phase change, while beam 46 of strength $E_o(1-r)^2$ is transmitted through exit surface 14.

The intensity ($I=E^2$) of laser beam 18 on entrance surface 12, $I_{ENTR}$, is given by $$I_{ENTR} = |E_o + rE_o\exp(i\pi)|^2 \quad (1)$$

$$= E_o^2(1-r)^2.$$

The intensity of transmitted beam 44 in body 10, $I_{IN}$, is $$I_{IN} = E_o^2(1-r)^2. \quad (2)$$

Similarly, the intensity of beam 46 on exit surface 14 of body 10, $I_{EXIT}$, is $$I_{EXIT} = |E_o(1-r) + rE_o(1-r)|^2 \quad (3)$$

$$= (1+r)^2 E_o^2 (1-r)^2.$$

To avoid initiation of laser drilling on entrance surface 12 of body 10, or internally in body 10, both the beam intensity $I_{ENTR}$ on entrance surface 12 and the beam intensity in body 10, $I_{IN}$, must be less than the intrinsic damage threshold, $I_{DAM}$, of the material of body 10, $$I_{ENTR} < I_{DAM}, \quad (4a)$$

and $$I_{IN} < I_{DAM}, \quad (4b)$$

where $I_{DAM}$ is the minimum intensity of beam 18 required to initiate drilling at the surface of impingement in the absence of any destructive interference at that surface. $I_{DAM}$ can be determined experimentally.

In contrast, to initiate drilling at exit surface 14 of body 10, the beam intensity $I_{EXIT}$ at exit surface 14 must exceed the intrinsic damage threshold $I_{DAM}$ for the material of body 10, $$I_{EXIT} > I_{DAM}. \quad (5)$$

The combination of Eqs. (1)–(5) gives the incident beam intensity ($I_o = E_o^2$) range over which reverse laser drilling occurs, $$\frac{1}{[(1+r)^2(1-r)^2]} < \frac{I_o}{I_{DAM}} < \frac{1}{(1-r)^2}. \quad (6)$$

The amplitude coefficient of reflection is given by $$r = \frac{n_m - n_o}{n_m + n_o} \quad (7)$$

where $n_m$ is the index of refraction of the material of body 10 being drilled and $n_o$ is the index of refraction of the medium surrounding body 10 ($n_o = 1$ for air). From Eqs. (6) and (7), the conditions for the reverse laser drilling of various transparent materials can be determined. FIG. 5 is a map for representative transparent media showing the ranges of intensity for incident laser beam 18, effectively giant pulse 32, normalized by the intrinsic damage threshold intensity of the material versus the index of refraction of the material. Above curve B, forward laser drilling will occur. Between curves B and A, conditions are favorable for reverse laser drilling. Below curve A, no drilling will occur.

The first order calculations made above assume that $\nu$, the coefficient of absorption of body 10 for impinging laser beam 18 is zero, i.e., the material is completely transparent to the laser beam meaning that none of the energy of beam 18 is absorbed by body 10 as the beam passes through the body. The principles derived above can be extended to bodies for which the coefficient of absorption, $\nu$, is greater than zero as long as the resulting intensity at the exit interface caused by constructive interference is greater than the resulting intensity at the entrance interface caused by destructive interference. Equation (6), modified to account for the case where $\nu$ is greater than zero, i.e., the case where body 10 is substantially or partially transparent is:

$$\frac{e^{\mu T}}{[(1 + r)^2(1 - r)^2]} < \frac{I_o}{I_{DAM}} < \frac{1}{(1 - r)^2}$$

where T is the thickness of body 10. p In order that those skilled in the art might better understand how the present invention may be practiced, the following examples are given by way of illustration and not by way of limitation.

EXAMPLE I

Single crystal sapphire wafers 5.08 cm and 7.62 cm in diameter and 0.033 cm thick with an orientation of $(1\bar{1}02)\pm 2°$ were obtained from Union Carbide Crystals Products, San Diego, Cal. The front surface of the wafer had a polished optical finish while the rear surface had a ground frosted appearance with a surface relief of 1 νm.

The laser drilling equipment used to reverse drill hole in the sapphire wafers was an Electro Scientific Industries Laser Trimming Systems Model 25 equipped with a Nd:YAG laser having a wavelength of 1.06 νm with a 6.5 Watt output in the continuous wave (CW) mode. With the optics used, the depth of focus was approximately 250 νm and the beam size was 75 νm in diameter.

The laser, which was operated in a repetitively Q-switched mode, emitted a beam of a continuous train of individual pulses with a pulse period ($P_p$) of 0.33 milliseconds (msec) within which the pulse duration was 200 nanoseconds (nsec), and the pulse train duration period ($T_p$) was 5 msec, as shown in FIG. 2. This initial train of pulses was followed by a delay time, $T_d$, of 45 msec and then a second train of pulses identical to the first pulse train.

The 0.33 msec pulse period was selected because it gave the highest output power of the laser device operating in the repetitively Q-switched mode at a given flash lamp input power. The delay time of 45 msec between pulse trains was selected so that the flash lamps would have sufficient time to pump up the Nd:YAG crystal to an energy density where a giant pulse of the required intensity for reverse laser drilling, i.e., between curves A and B at the index of refraction for sapphire ($Al_2O_3$) on FIG. 5, would be produced on initiation of the repetitive Q-switched train of pulses. Nine laser pulse trains were required to drill a hole completely through the wafers. As explained in more detail below, an energy reflector in the form of an opaque polycrystaline alumina backup disk was placed approximately 625 νm from the rear frosted surface of the sapphire wafer. Typically, the holes were slightly tapered through the thickness dimension of the wafer, with the taper being narrower toward the surface on which the laser beam impinged and toward which the hole progressed. The average hole diameter was about 1 mil and it was found that adjacent holes could be spaced as closely as 2 mils, hole center-line to hole center-line, without causing cracking, spalling or other damage to the wafer.

The reverse laser drilling was not a sensitive function of the position of the focal point of the laser in the sapphire crystal. With a depth of focus of about 250 νm, reverse laser drilling occurred over a wide range of wafer positions and was not limited to those wafer positions where the exit surface of the wafer lay in or close to the focal point of the laser.

Laser drilling was found to be sensitive to local surface conditions. For example, in one wafer, all but one of 100 hole positions yielded holes that extended all the way through the wafer. In contrast, the unsuccessfully drilled hole position did not show any evidence of initiation of drilling. It was found that one could return again and again to such positions (the machine positioner was accurate to about ±1 νm) and repeat the drilling operation and not be able to drill a hole. Drilling yields also varied from one wafer lot to another. In particular, it was found that reverse laser drilling was more difficult on wafers that were 7.62 cm in diameter than wafers that were 5.08 cm in diameter, although both wafer lots were obtained from the same source.

Although not yet completely understood, the inability to reverse laser drill certain regions may be caused by surface contamination on the rear face of the wafer. For example, a thin film (e.g., oil) with an index of refraction lower than sapphire on the rear face of the wafer could decrease the net beam intensity at the rear interface by reducing the intensity of the constructively interfering reflected beam at the sapphire-film interface and/or by generating a reflected beam from the film-air interface that destructively interferes with the beam passing through the sapphire.

Alternatively, it is possible that the surface finish of the wafer is slightly different in these "undrillable" regions, since it is a generally known fact that the threshold for laser-induced surface damage is a sensitive function of the condition of the surface being irradiated. Thus, the different drilling yields observed between 7.62 and 5.08 cm diameter wafers are probably a result of slightly different surface finishes on the different size wafers.

Drilling yields (the number of successfully drilled holes divided by the number of drill hole positions attempted) were maximized when the laser beam impinged on the polished surface of the wafer. A 50% decrease in yields occurred when the laser beam impinged on the ground surface of the wafer. A probable reason for this difference is illustrated schematically in FIGS. 6A and 6B. When laser beam 18 is incident on polished surface 12 of wafer 10 (FIG. 6A), beam 18 remains tightly bunched until it strikes ground exit surface 14 of wafer 10. Tightly bunched beam 18 has a high intensity that favors initiation of reverse drilling on exit face 14, thus maximizing drilling yields. In contrast, when the laser beam impinges on rough surface 14 of wafer 10 (FIG. 6B), beam 18 tends to diverge and spread as it passes through entrance surface 14 of wafer 10. The spreading of beam 18 reduces the beam intensity on polished exit face 12 of wafer 10, thereby decreasing the chance of initiating reverse drilling on exit face 12 thus reducing drilling yields.

Drilling yields were maximized (100%) when the sapphire wafer was placed on an energy reflector in the form on an opaque polycrystalline alumina disk having approximately the same dimensions as the sapphire wafer. Unfortunately, the ejected debris had no place to go in this situation, so the drill holes became encrusted and plugged near the exit surface of the wafer by recondensed debris. When the sapphire wafer was suspended in space with no material behind it, drilling yields dropped to about 90%, although the holes were clean and unencumbered with recondensed debris. A good compromise between these two situations was achieved when the alumina backup disk was placed 625 νm from and substantially parallel to the rear exit surface of the sapphire wafer. Drilling yields from 95 to 100%, depending on the wafer lot, were achieved in this case with unclogged and relatively clean drill holes. One possible, but not limiting, explanation is that placement of the energy reflector near the back surface of the sapphire wafer increased reverse laser drilling yields because the reflection of the laser beam from the energy reflector increased the beam intensity on the bottom face of the sapphire wafer. The reverse laser drilling yields may also have been enhanced by the heat from the hot plasma plume which was ejected from the energy reflector as the energy reflector was impacted and drilled by the transmitted laser beam.

EXAMPLE II

The equipment and procedures described in detail above in Example I were used to reverse laser drill holes in silicon-on-sapphire (SOS) wafers. The SOS wafers were a composite of a substrate of single crystal sapphire and a contiguous overlying epitaxially-grown layer of single crystal silicon. The major surfaces of the SOS wafers were parallel to the (1̄102) plane of the single crystal sapphire to within ±2° and to the (100) plane of the single crystal epitaxial silicon to within ±2°. The exposed silicon of one major surface of the SOS wafers was polished to an optical finish smoother than about ±0.1 micron and the exposed sapphire of the other major surface of the SOS wafers was ground to a finish smoother than about ±0.5 micron. The thickness of the epitaxial silicon layer was typically about 1 micron while the thickness of the sapphire layer was 325±25 microns. The SOS wafers with the 1 micron thick epitaxial silicon layer, upon which the laser beam was impinged, were optically equivalent to the sapphire wafers of Example I, i.e., were substantially transparent to the radiation of the Nd:YAG laser employed.

Similar results, as described above in Example I for the reverse laser drilling of sapphire wafers were obtained for the silicon-on-sapphire wafers for this example.

The above recited laser beam parameters of pulse period, pulse duration, pulse train duration time and delay time between pulse trains were found to be optimum for the reverse laser drilling of the sapphire and silicon-on-sapphire wafers of Examples I and II. It may be necessary and desirable to depart somewhat from those given specific values when reverse laser drilling other transparent or substantially transparent materials as will be understood by and will be within the capabilities of those skilled in this art. Accordingly, it is to be understood that the foregoing detailed description is given merely by way of illustration and that numerous modifications may be made therein without departing from the spirit or the scope of the present invention.

What is claimed is:

1. A method for reverse laser drilling comprising the steps of:
   (a) providing a body of material and laser beam means which emits a laser beam of a frequency such that said body of material is at least substantially transparent to said beam, said body having first and second substantially parallel major surfaces and a peripheral edge area interconnecting said major surfaces, the perpendicular distance between said major surfaces being the thickness of said body, said laser beam being further characterized by a sequence of pulse trains having an initial giant pulse of a first intensity and a series of following smaller pulses of a second intensity less intense than said first intensity, said first intensity being selected by determining the index of refraction of the body of material and by selecting an incident laser beam intensity from the area labelled Reverse Laser Drilling in the graph of FIG. 5;
   (b) impinging said laser beam on said first surface; and
   (c) drilling a hole through the thickness of said body, said hole progressing from said second surface to said first surface.

2. The method of claim 1 further including the step of placing an energy reflector substantially parallel to and separated from said second surface of said body.

3. A method for reverse laser drilling comprising the steps of:
   (a) providing a body of material and laser beam means which emits a laser beam of a frequency such that said body of material is at least substantially transparent to said beam, said body having first and second substantially parallel major surfaces and a peripheral edge area interconnecting said major surfaces, the perpendicular distance between said major surfaces being the thickness of said body, said laser beam being further characterized by a sequence of pulse trains having an initial giant pulse of a first intensity and a series of following smaller pulses of a second intensity less intense than said first intensity, a pulse period, a pulse duration, a pulse train duration time, and a delay time between said trains, said first intensity being selected by determining the index of refraction of the body of material and by selecting an incident laser beam intensity from the area labelled Reverse Laser Drilling in the graph of FIG. 5;
   (b) impinging said laser beam on said first surface, and
   (c) drilling a hole through the thickness of said body, said hole progressing from said second surface to said first surface.

4. The method of claim 3 further including the step of placing an energy reflector susbtantially parallel to and separated from said second surface of said body.

5. A method for reverse laser drilling comprising the steps of:
   (a) providing a body of material and laser beam means which emits a laser beam of a frequency such that said body of material is at least substantially transparent to said beam, said body having first and second substantially parallel major surfaces and a peripheral edge area interconnecting said major surfaces, the perpendicular distance between said major surfaces being the thickness of said body, said laser beam being further characterized by a sequence of pulse trains having an initial giant pulse of a first intensity and a series of following smaller pulses of a second intensity less intense than said first intensity, a pulse period, a pulse duration, a pulse train duration time, and a delay time between said trains, said first intensity being selected by determining the index of refraction of the body of material and by selecting an incident laser beam intensity from the area labelled Reverse Laser Drilling in the graph of FIG. 5;
   (b) placing an energy reflector substantially parallel to and separated from said second surface of said body;
   (c) impinging said laser beam on said first surface; and (d) drilling a hole through the thickness of said body, said hole progressing from said second surface to said first surface.

6. The method of claim 5 wherein the material of said body is sapphire.

7. The method of claim 6 wherein said pulse period is about 0.33 msec, said pulse duration is about 200 nsec, said pulse train duration time is about 5 msec and said delay time between said trains is about 45 msec.

8. The method of claim 7 wherein said energy reflector is polycrystalline alumina.

9. The method of claim 8 wherein said energy reflector is separated from said second surface of said body by about 625 $\nu$m.

10. The method of claim 5 wherein the material of said body is silicon-on-sapphire.

11. The method of claim 10 wherein said pulse period is about 0.33 msec, said pulse duration is about 200 nsec, said pulse train duration time is about 5 msec and said delay time between said trains is about 45 msec.

12. The method of claim 11 wherein said energy reflector is polycrystalline alumina.

13. The method of claim 12 wherein said energy reflector is separated from said second surface of said body by about 625 l $\nu$m.

* * * * *